(12) United States Patent
Lin (10) Patent No.: US 6,965,516 B1
(45) Date of Patent: Nov. 15, 2005

(54) MINI CASE FOR COMPUTER

(76) Inventor: Shu-Fen Lin, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 10/849,861

(22) Filed: May 21, 2004

(51) Int. Cl.[7] ................................................. G06F 1/16
(52) U.S. Cl. ..................... 361/727; 312/332.1; 361/759
(58) Field of Search ................................. 361/679–687, 361/724–727, 759, 754; 312/332.1, 223.2; 360/137 D, 97.01, 98.01

(56) References Cited

U.S. PATENT DOCUMENTS

| | | | |
|---|---|---|---|
| 6,231,144 B1 * | 5/2001 | Chen et al. ............... | 312/332.1 |
| 6,356,441 B1 * | 3/2002 | Claprood ..................... | 361/685 |
| 6,421,236 B1 * | 7/2002 | Montoya et al. ............ | 361/685 |
| 6,565,167 B1 * | 5/2003 | Miller et al. ............. | 312/332.1 |

* cited by examiner

Primary Examiner—Hung Van Duong (57) ABSTRACT

The present invention relates to an improved case for a computer, which is small in volume, convenient in carrying, easy in assembly, simply in wiring, low in cost, convenient for plugging in from the front, and good in heat transmission.

Its peculiar structure includes a front panel, a rear panel, support frames, a case, and a handle, wherein, an ventilation opening formed on Aluminium supporting frames; a front panel and a rear panel each secured by a locking plate to supporting frames; a circuit board formed on supporting frames without a bottom plate; an anti-dust cover, with sockets connecting with the circuit board, formed in a front; and a retractable handle, being fixed on a fastener, formed on a groove atop a case. Thereby, the present invention is both advanced and pragmatic in enhancing operation.

1 Claim, 9 Drawing Sheets

MINI CASE FOR COMPUTER

BACKGROUND OF THE INVENTION (a) Field of the Invention

The present invention relates to a mini case for a computer. Its peculiar structure is formed by a retractable handle, an ventilation opening formed on a case, a circuit board secured on a supporting frame without a bottom plate, sockets formed in the front, an anti-dust cover formed in the front, and a front panel and a rear panel each secured by a locking plate to the supporting frame.

(B) Description of the Prior Art

Figure 1:
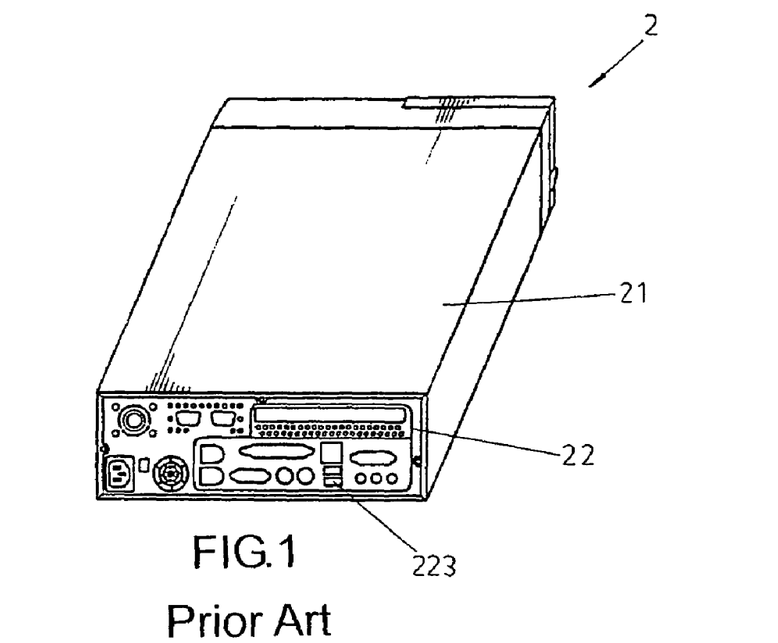
FIG. 1 shows a perspective view of a conventional case.
Figure 2:
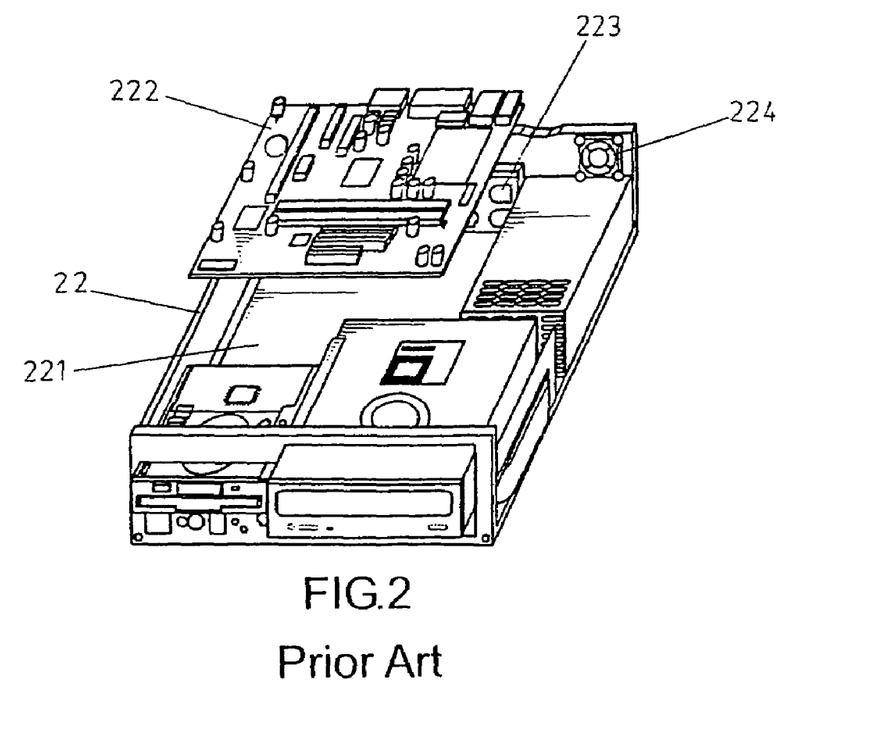
FIG. 2 shows a perspective view without a case of a conventional case.

Referring to FIGS. 1 and 2. A conventional product includes a computer 2, a case 21, and a supporting frame 22, wherein sockets 223 and a fan 224 formed behind. To place a circuit board 222, a bottom plate formed underneath the inner frame 22. Common deficiencies in conventional cases include (1) large in volume; (2) inconvenient in carrying; (3) difficult in assembling; (4) complex in wiring; (5) high in cost; (6) inconvenient for plugging in from the rear; (7) bad in heat transmission.

SUMMARY OF THE INVENTION

The present invention relates to an improved case, which is small in volume, convenient in carrying, easy in assembling, simple in wiring, convenient for not plugging in from rear, and good in heat transmission.

Its peculiar structure includes a retractable handle formed on a groove atop a case, an ventilation opening formed on supporting frames, a circuit board secured without a bottom plate, sockets with an anti-dust cover formed in a front, and a front panel and a rear panel each secured by a locking plate to supporting frames.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 3:
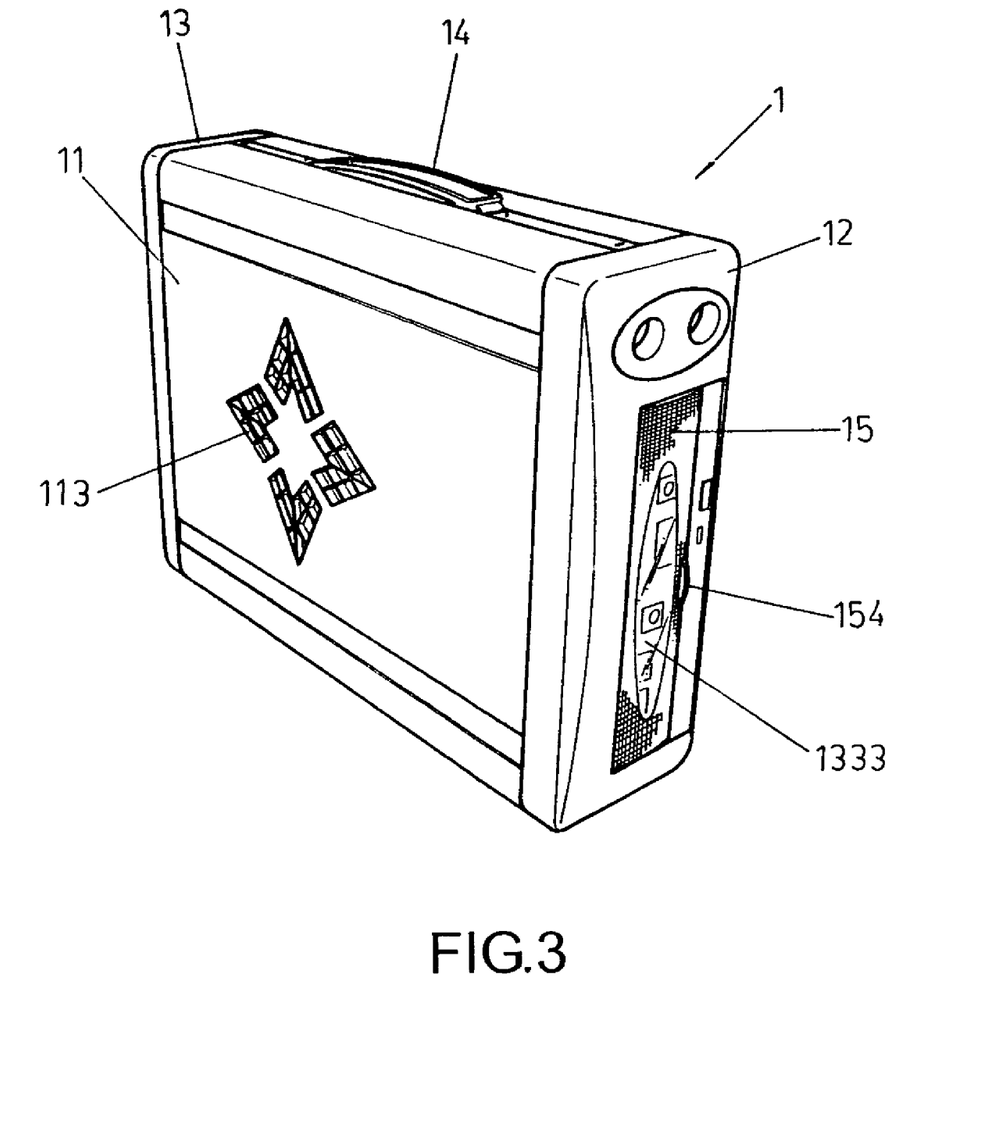
FIG. 3 shows a perspective view of the present invention.
Figure 4:
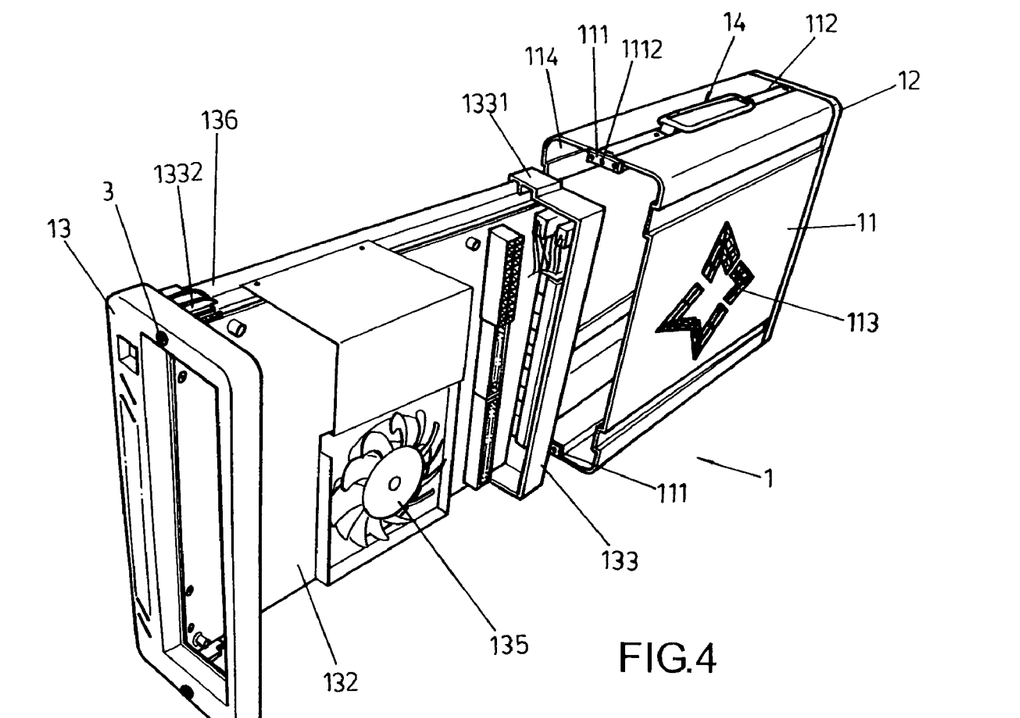
FIG. 4 shows an exploded elevational view of the present invention without a circuit board.

Referring to FIGS. 3~4. The present invention is a mini case 1 comprising a front panel 12, a rear panel 13, supporting frames 136, a case 11, and a handle set 14.

Figure 9:
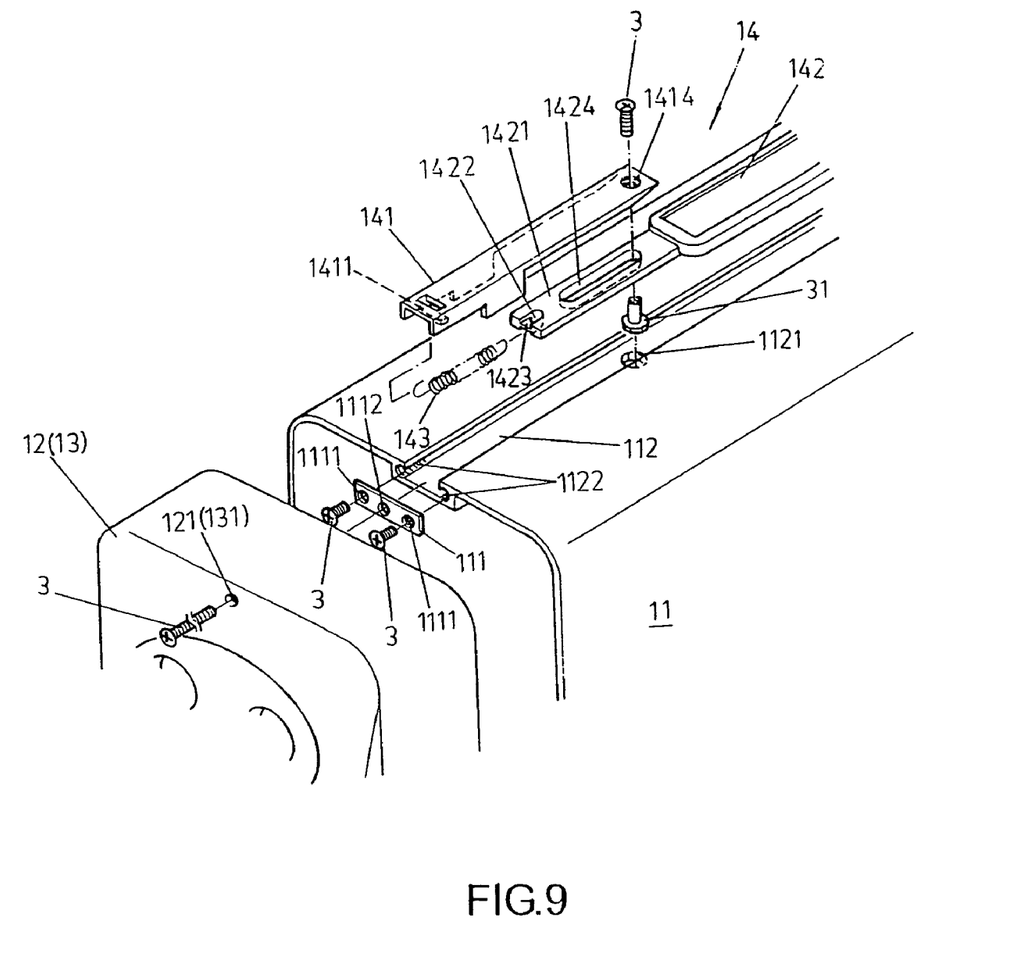
FIG. 9 shows an exploded elevational view of a handle, a case, and the front/rear panel of the present invention.
Figure 10:
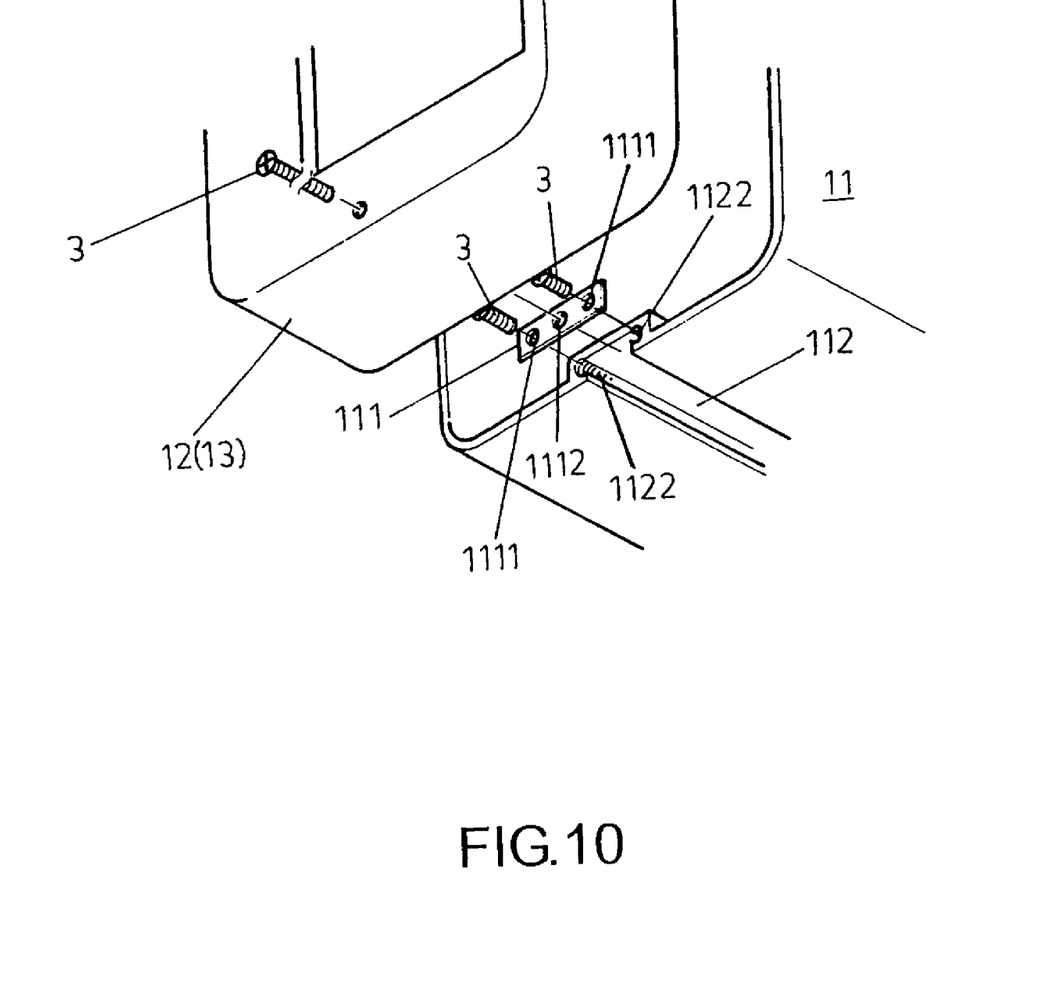
FIG. 10 shows an exploded elevational view of a case and the front/rear panel of the present invention.
Figure 11:
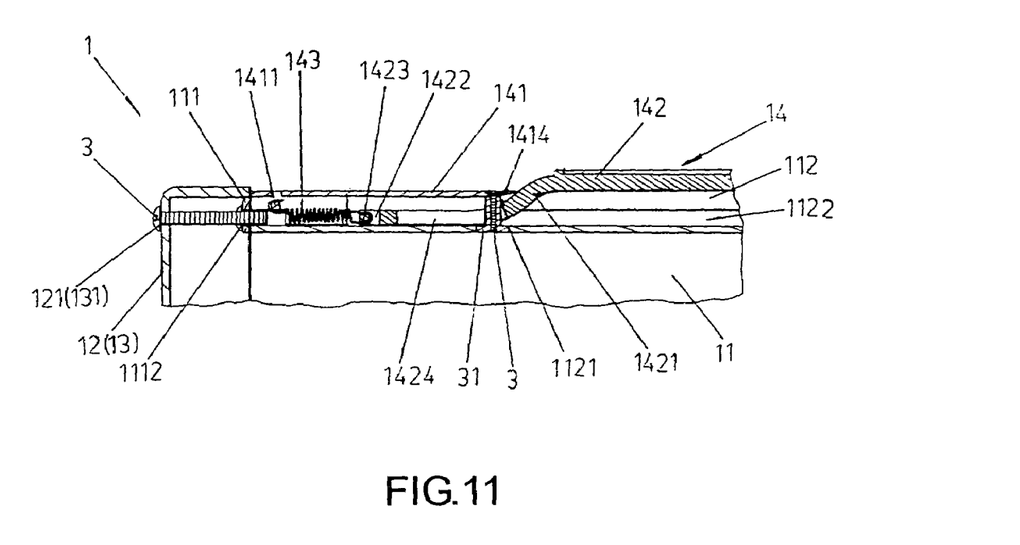
FIG. 11 shows an exploded elevational view of a retracted handle of the present invention.
Figure 12:
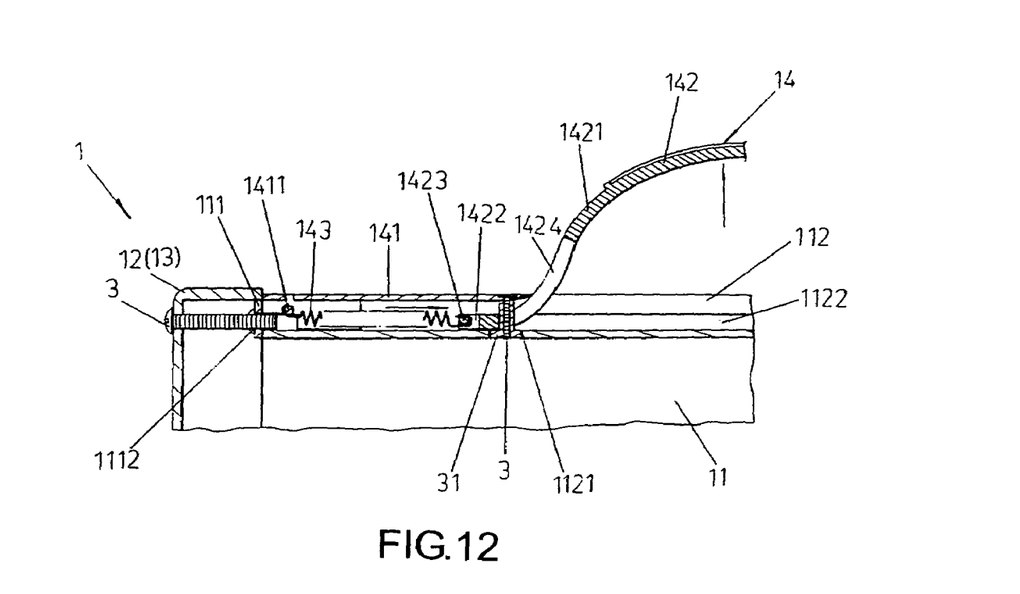
FIG. 12 shows an exploded elevational view of a pulled-out handle of the present invention.
Figure 13:
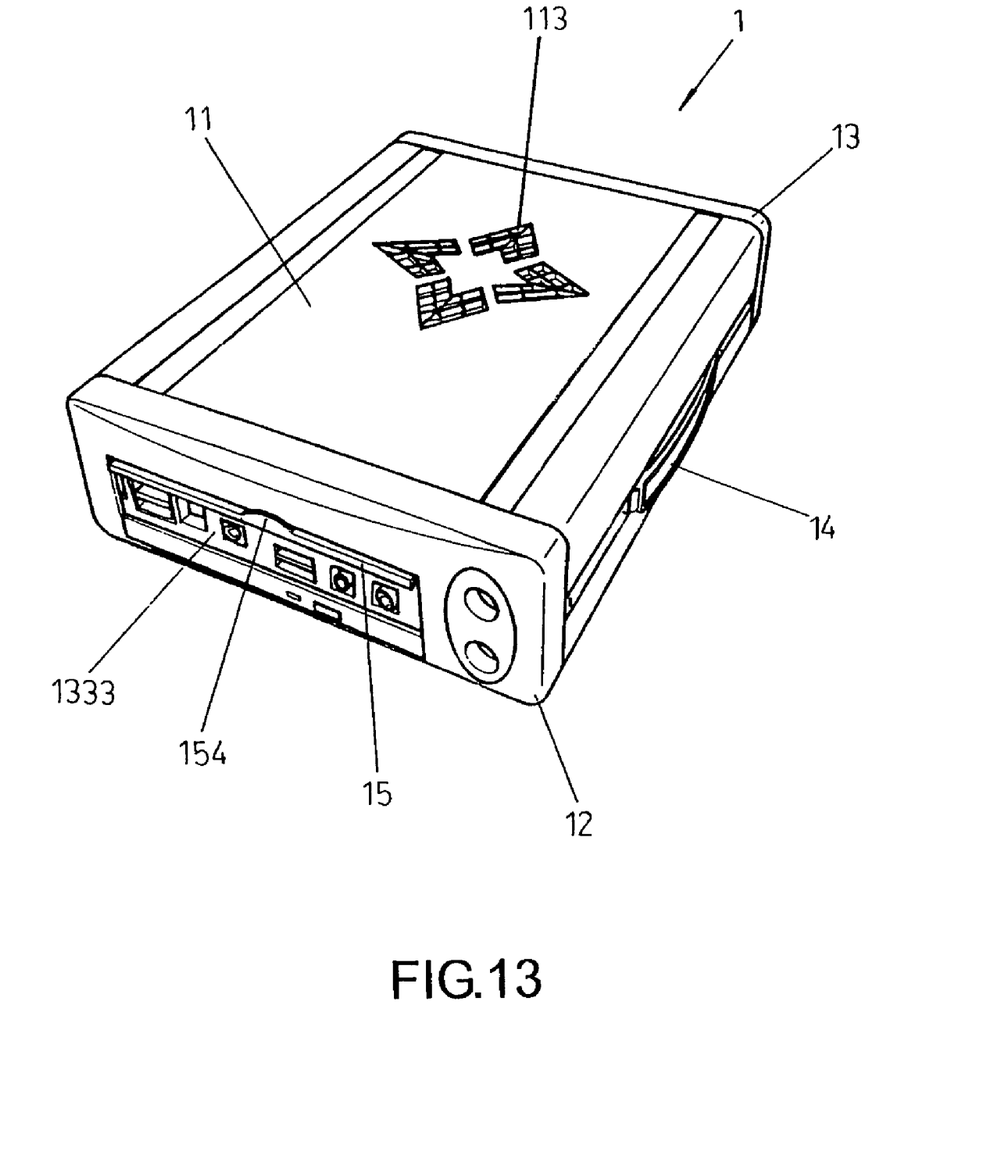
FIG. 13 shows a laid-down perspective view of the present invention.

Referring to FIGS. 4 and 9/10. The case 11 is formed enclosing the whole computer element, wherein on a lateral a ventilation opening 113 formed. On a top and a bottom of the case 11, a groove 112 formed, wherein two screwed holes 1122 formed on each end, with two screws 3 penetrating through holes 1111 to fasten a locking plate 111 thereof on each end.

Figure 5:
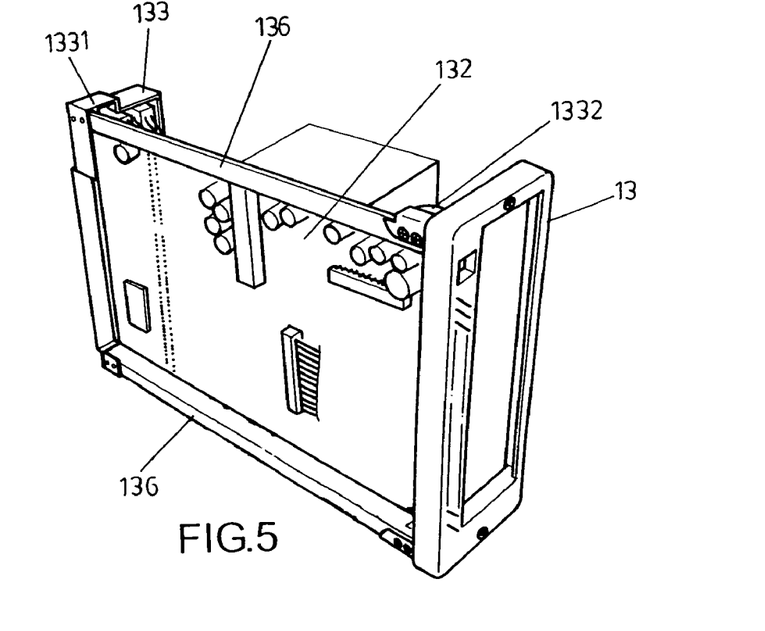
FIG. 5 shows an exploded elevational view of the present invention without a circuit board and a case.

Referring to FIGS. 4 and 5. Two supporting frames 136, made of Aluminium to enhance heat transmission, formed inside the case 11 as a fixture for directly securing parts and a circuit board 132 thereon without a bottom plate. A fan 135 formed right behind the ventilation opening 113 to blow heat out of the circuit board 132. Supporting frames 136, with guiding blocks 1331 and 1332 formed thereof, can be guided through a space 114 and fixed in the case 11.

Figure 6:
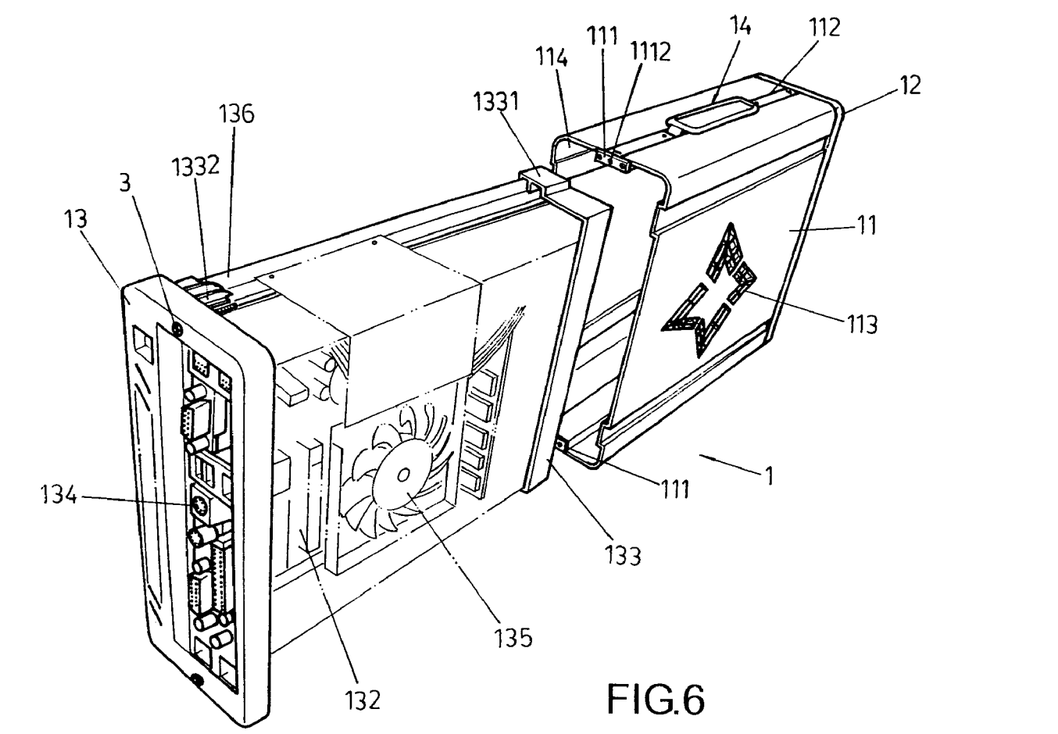
FIG. 6 shows an exploded elevational view of the present invention.
Figure 7:
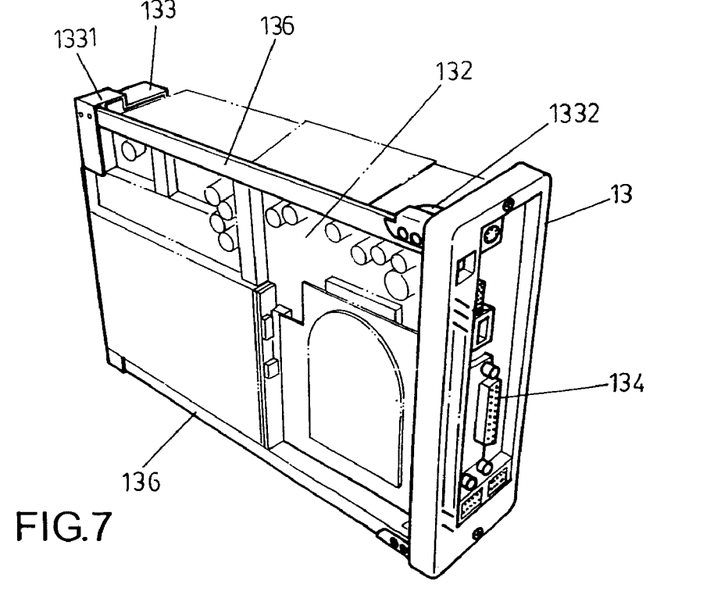
FIG. 7 shows an exploded elevational view of the present invention without a case.
Figure 8:
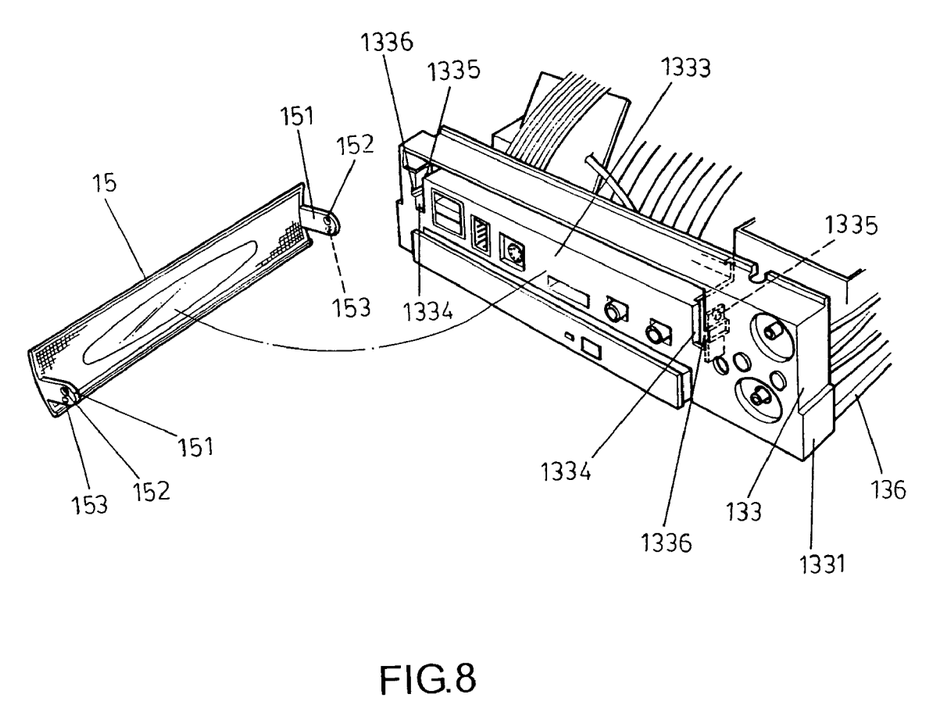
FIG. 8 shows an exploded elevational view of a front panel and a lid of the present invention.

Referring to FIGS. 6, 7 and 9/10. The front panel 12 and the rear panel 13 formed each end of supporting frames 136 and fastened by a screw 3 through a hole 121 (or 131) on the front panel 12 (or the rear panel 13) to a hole 1112 on the locking plate 111. On the rear panel 13, a set of sockets 134 formed. Referring further to FIG. 8. Inside the front panel 12, inner sockets 1333 connecting with the circuit board 132 formed on an inner panel 133, thereby plugging can be made from the front panel 12. A rectangular opening 1334 formed on each end of the inner panel 133, wherein a convex 1335 and a groove 1336 formed. A hole 152, formed on a short plate 151 perpendicular to a lid 15, is designed to engage with the convex 1335, thereby forming a rotating axle for opening or closing a lid 15. A projection 153, formed on the short plate 151 perpendicular to the lid 15, is designed to inlay in the groove 1336, thereby sliding of the lid 15 in the groove 1336 can be made.

Referring to FIGS. 9~13. The handle set 14 having a handle 142 and a fastener 141 formed in the groove 112 of the case 11. A sliding groove 1424 formed on an extension 1421 of the handle 142. A retractable handle mechanism is formed by

- a screw 3 penetrating a hole 1414 on the fastener 141 and the sliding groove 1424 to engage with a bolt 31 penetrating through a hole 1121 on the groove 112, thereby securing the handle 142 in place and also restraining a moving action of the handle 142 within the sliding groove 1424;
- a spring 143 with an end connecting to a locking device 1423 formed in a hole 1422 on each end of the handle 142 and with the other end connecting to a locking bar 1411 formed at each end of the fastener 141, thereby an extension or a retraction can be made when pulling up or releasing the handle 142.

The lid 15 is formed on the front panel 12 to protect the inner panel 133 from dusting, wherein a projection 154 is formed to facilitate the opening or closing movement of the lid 15. After opening the lid 15, inner sockets 1333 connecting to the circuit board 132 expose to outside and plugging can easily be made from the front panel 12.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A mini case for computer comprising a front panel, a rear panel, support frames, a case, and a handle set, wherein,
- the case with a ventilation opening formed on a lateral thereof and with a groove formed on a top and a bottom thereof, wherein two screwed holes formed each end, each fastened a locking plate with screws;
- two supporting frames formed inside the case as a fixture for securing a circuit board, without a bottom plate; a fan formed right behind the ventilation opening to blow heat out of the circuit board; supporting frames, with guiding blocks formed thereof, can be guided through a space and fixed in the case;
- an inner panel, with inner sockets connecting to the circuit board, formed behind a front panel, thereby plugging can be made from the front; a rectangular opening formed on each end of the inner panel, wherein a convex and a groove formed, to be engaged with a hole and a projection on a lid, thereby the lid can move in and out the groove and rotate to open and close;
- a handle formed in the groove of the case; a sliding groove formed on an extension of the handle; a screw penetrating a fastener and the sliding groove to engage with a bolt penetrating the groove of the case, thereby securing the handle in place and restraining the handle moving within the sliding groove; a spring with an end connecting to an end of the handle and with the other end connecting to the fastener, thereby an extension or a retraction can be made when pulling or releasing of the handle.

* * * * *